United States Patent [19]
Savin

[11] Patent Number: 5,252,632
[45] Date of Patent: Oct. 12, 1993

[54] LOW COST CATHODIC AND CONDUCTIVE COATING COMPOSITIONS COMPRISING LIGHTWEIGHT HOLLOW GLASS MICROSPHERES AND A CONDUCTIVE PHASE

[76] Inventor: Ronald R. Savin, 11001 Muirfield Dr., Rancho Mirage, Calif. 92270

[21] Appl. No.: 978,621

[22] Filed: Nov. 19, 1992

[51] Int. Cl.$^5$ .............. C08K 3/32; C08K 3/08; C08K 7/28
[52] U.S. Cl. .................. 523/137; 252/512; 252/513; 252/514; 252/519; 428/313.9; 428/315.5; 523/219; 524/494
[58] Field of Search ........... 428/313.9, 315.5; 523/137, 219; 252/512, 513, 514, 519; 524/494

[56] References Cited

U.S. PATENT DOCUMENTS

| | | | |
|---|---|---|---|
| 3,475,213 | 10/1969 | Stow | 428/328 |
| 3,609,104 | 9/1971 | Ehrreich | 252/512 |
| 3,998,771 | 12/1976 | Feneis, Jr. et al. | 260/18 |
| 4,098,945 | 7/1978 | Oehnke | 252/513 |
| 4,412,029 | 10/1983 | Kehr et al. | 523/219 |
| 4,417,007 | 11/1983 | Salensky et al. | 523/442 |
| 4,522,890 | 6/1985 | Volkers et al. | 428/624 |
| 4,566,990 | 1/1986 | Liu et al. | 252/513 |
| 4,618,525 | 10/1986 | Chamberlain et al. | 523/219 |
| 4,621,024 | 11/1986 | Wright | 428/404 |
| 4,715,989 | 12/1987 | Sullivan et al. | 523/137 |
| 4,748,194 | 5/1988 | Geeck | 523/427 |
| 4,765,928 | 8/1988 | Thakur | 252/500 |
| 4,891,394 | 1/1990 | Savin | 523/442 |
| 4,931,479 | 6/1990 | Morgan | 252/512 |

FOREIGN PATENT DOCUMENTS 2602239 2/1988 France.

Primary Examiner—Veronica P. Hoke
Attorney, Agent, or Firm—Frost & Jacobs

[57] ABSTRACT

Improved, low-cost coating compositions, comprising lightweight, non coated hollow, glass microspheres having high isostatic crush resistance, low specific gravity and low oil absorption, are disclosed for use as cathodic coatings for prevention of corrosion in metallic substrates; and for use as conductive coatings for attenuation of EMI/RFI interference in electronic components, the conductive coatings being suitable for application on metallic and non-metallic substrates.

46 Claims, No Drawings

LOW COST CATHODIC AND CONDUCTIVE COATING COMPOSITIONS COMPRISING LIGHTWEIGHT HOLLOW GLASS MICROSPHERES AND A CONDUCTIVE PHASE

FIELD OF THE INVENTION

This invention relates generally to organic solvent-based, water-borne and powder, coating compositions. Particularly, one use of this invention relates to improved, low-cost cathodic coating compositions for the protection of metallic substrates from corrosion, by the incorporation of hollow, lightweight, glass microspheres uniformly throughout the thickness of the coating. More particularly, this invention provides a metal-rich composition containing lightweight hollow, glass microspheres for ferrous metal substrates. Particularly, a second use of this invention relates to improved low-cost organic, conductive coatings compositions for providing shielding from radio frequency interference (RFI) and electro-magnetic interference (EMI). More particularly, this invention provides coating compositions comprising a powder of a metal with good conductivity, such as gold, silver, copper or nickel and lightweight, hollow, glass microspheres dispersed uniformly throughout the thickness of the coating.

BACKGROUND OF THE INVENTION

With regard to the first use of this invention, various compositions have been used as protective coatings, containing polymers such as phenolic resins, polyesters, polyurethanes, epoxy resins and polyvinyl chloride resins, which also contain metallic chromates or phosphates, metallic oxides and/or zinc in particulate form. Zinc-rich primers have been considered to be optimum anti-corrosion coatings on iron or steel substrates. However, certain problems have restricted their use as industrial type primers. The action of zinc powder in inhibiting rust is based on an electrochemical interaction between the zinc and the steel substrate. In order not to insulate the zinc particles from each other and from the substrate the prior art has considered it necessary to use very little binder, with satisfactory corrosion protection achieved only when the zinc:binder ratio is at least about 9:1. The high zinc level and the relatively high density of zinc powder often cause undesirable settling during short term storage. Hence, the zinc powder is often added just prior to application and mixed rapidly during application to prevent settling and clogging of spray equipment. This deters efficient field use.

A low binder content was previously considered to be an advantage since a higher binder level would isolate the metallic grains from each other and from the substrate to be protected, thereby providing ineffective cathodic protection.

A lower zinc content is disclosed in U.S. Pat. No. 3,998,771, issued December, 1976 to T. J. Feneis, Jr. et al, which describes water-based coating compositions for application on iron supports to obtain anti-corrosive coatings. Single phase compositions in this patent include about 2% to 10% by weight of a non-volatile liquid epoxy resin, with low viscosity, derived from bisphenol A and an epihalohydrin, e.g., epichlorohydrin; about 2% to 10% by weight of a modified polyamide, i.e., an addition product of a water soluble polyamide and a liquid epoxy resin; and about 55% to 70% by weight of a zinc-powder pigment having an average particle size of about 2 to 15 microns.

U.S. Pat. No. 4,417,007, issued November 1983 to G. A. Salensky et al, discloses a one component composition containing from about 4% to 25% by weight epoxy or phenoxy resin binder and a polyamine hardener, about 43% to 90% by weight zinc dust, about 3% to 38% by weight $Mn_3O_4$ fume pigment, up to 35% by weight additional pigments including pigment extenders and fillers (such as talc, clays, diatomaceous silica and silica), up to 5% by weight pigment suspension agent (such as hydrous magnesium silicate and lecithin), and balance organic solvents. A 1:1 volume ratio of zinc dust:$Mn_3O_4$ is preferred.

U.S. Pat. No. 4,891,394, issued January 1990 to the applicant of the present invention, discloses a coating composition for the protection of metallic and non-metallic substrates against environmental attack, comprising about 10% to about 25% by weight of a film-forming polymer which may be epoxy resins having an epoxide value of about 250 to 2500, vinyl chloride resins copolymerized with polyisocyanates, and/or vinyl chloride resins copolymerized with melamines; about 30% to about 60% by weight particulate metallic zinc; an agent for control of electrical conductive characteristics comprising a crystalline silica having an oil absorption value of less than 20 as measured by ASTM Test D281-84, the volumetric ratio of such agent to the metallic zinc ranging from about 0.7:1 to about 1.25:1; about 2% to about 3% by weight of an agent for control of rheological characteristics comprising a pyrogenic amorphous silica having an average particle size less than about 0.012 micron; and at least one solvent compatible with the polymer.

French patent application 2,602,239, published Feb. 19, 1988 in the name of the applicant of the resent invention, discloses a two phase coating composition containing up to 70% by weight of a powdered metal (based on the total weight of the composition after admixture), from about 2% to 30% of a film-forming polymer, about 2% to about 30% of a hardener for the polymer, at least 1.8% to 30% of an agent for control of rheological characteristics, and up to 30% by weight organic solvents. The preferred polymer is an epoxy resin having an average molecular weight of 350 to 3800. The agent for control of rheological characteristics comprises at least one pyrogenic silica and optionally at least one natural or transformation silica having an oil absorption value preferably not greater than 90 and more preferably not greater than 40. In the specific examples, pyrogenic silicas were used having average particle sizes of about 0.014 micron, about 0.007 micron and about 0.008 micron.

U.S. Pat. No. 4,748,194, issued May 1987 to Geeck, discloses a coating composition for the protection of gas tanks, comprising a powder metal (such as zinc, cadmium, stainless steel, aluminum, alloys or mixtures thereof), a linear epoxy or phenoxy resin having a molecular weight of less than 15,000 cross-linked with a blocked isocyanate, a suspension agent, a thixotropic agent, and "active" and "inactive" organic solvents. The proportion of powdered metal present ranges from 13 to 52 parts per hundred. The suspension agent disclosed in this patent is polyethylene, and the thixotropic agent is silane treated silicon dioxide, in amounts up to 2 parts per hundred.

U.S. Pat. No. 4,621,024, issued Nov. 4, 1986 to F. A. Wright, discloses metal coated microspheres and a process for preparation thereof. Particulate zinc, aluminum, silver, copper, stainless steel, platinum, gold, or mixtures thereof, having an average particle size of about 6 to 10 microns, are bonded to the surfaces of non-conductive microspheres by means of a thermosetting adhesive coating on the microspheres with application of heat, followed by intermittent mixing in the absence of heat. The microspheres may be fly ash, comprising about 80-96% by weight alumina-silica, with minor amounts of iron oxide, alkaline earth metal oxides and alkali metal oxides. The adhesive binder preferably comprises an organo-functional silane and a copolymerizable monomer. In the final product the metal is from about 15% to about 30% by weight, relative to the weight of the adhesive binder-coated microspheres. Although this patent discloses average particle size diameters of metal coated microspheres ranging from about 60 to 180 microns, the assignee of this patent also produces zinc coated microspheres of smaller average diameters, e.g., about 2.5 to about 60 microns.

The use of zinc-coated microspheres disclosed in the above mentioned U.S. Pat. No. 4,621,024 in zinc-rich inorganic binder compositions has been proposed by the prior art, as a partial replacement for zinc dust. More specifically, substitution of between 20% and 40% by volume of zinc-coated microspheres, for the zinc dust, has been evaluated in a silicate primer (produced by Carboline Company of St. Louis, Mo., under the trademark "Carbo Zinc 11"). Silicate binders of this type have a very slow drying time, and also require blast cleaning of the metal substrate prior to deposition of the coating. These coatings are electrically conductive.

Co-pending allowed patent application U.S. Ser. No. 07/639,782, filed Jan. 10, 1992, by the applicant of the present invention, now U.S. Pat. No. 5,182,318 discloses a coating composition exhibiting improved resistance to corrosion of metallic substrates. The glass microspheres in the '782 application are coated with zinc and are concentrated primarily at the exposed surface of a dry coating, so as to provide corrosion protection to the substrate. The '782 application provides suitable conditions (by solvent selection) for the hollow glass microspheres to rise to the surface of the coating, to provide the desired protection to the substrate.

Glass microspheres, not coated with a metal, heretofore have been used primarily in non-paint related uses such as: polymeric panels which form a part of airplanes; syntactic foams, electrical potting compounds, randomes in the aerospace industry; syntactic foams in the hydrospace industry; plastisols, adhesives, polymeric spare parts in the automotive industry; wall repair compounds, caulks, sealants and tape joint compounds in the construction industry; in increasing the velocity of detonation, optimum sensitization and chemical stability of industrial explosives; as part of sporting goods such as tennis rackets, flyfishing lines, bowling balls and golf balls; as trowling mix and putty for the marine market; and other applications.

In all of the above listed uses, some of the characteristics of "non-coated" microspheres which are of greatest significance are: the lightness (weight) and resulting lower composite density; spherical shape; inherent strength because of the sphericity, as compared to other fillers; cost effectiveness due to the lower composite density (cost is even lower for the "non-coated" microspheres compared to the metal-coated microspheres); chemical resistance; excellent moisture resistance; low dielectric constant; low electric conductivity; decreased application and drying time, etc.

Co-pending patent application Ser. No. 07/972,115 filed on November 5, by the applicant of the present invention, discloses an improved low-cost coating composition for use in non-gloss and low-gloss applications which require high, dry deposition thicknesses, said composition comprising, apart from the film-forming polymer and the volatile components, from about 5 to 30 volume percent of lightweight, hollow, glass microspheres, having diameters ranging from 1 to 150 microns.

As demonstrated by the '782 application and the "architectural" application, many of the above properties exhibited by these microspheres could be beneficially used in coatings-related applications. However, manufacturers such as 3M and PQ corp., make it clear that their sales of the "non-coated", hollow, glass microspheres in the past 12 years to the coatings industry have been insignificant, at best. The principal reason for this lack of enthusiasm for the lightweight microspheres is that their low specific gravity (specific gravity generally ranges from 0.1 to 0.6), causes the spheres to float to the surface (caking), making commercial exploitation rather difficult, except where this particular property is specifically desired and appropriately exploited, as in the '782 application.

With respect to both uses of the present invention, it is important that the final coating itself be a good conductor (have a conductivity of at most 3 ohms/cm$^2$). Conventional wisdom would therefore point away from using the "non-coated" microspheres, because of their low electrical conductivity.

The present invention, circumvents these possible problems, thereby making it possible for the coatings industry to harness the potentially tremendously advantageous properties displayed by these microspheres, listed above. This invention solves the "lightness" problem with the use of (1) appropriate wetting agents; (2) appropriate dispersants;(3) appropriate chemical thickeners; and (4) glass microspheres with specific gravity greater than water. It is believed that the low electrical conductivity problem is overcome by (a) the inherent tendency of the microspheres to occupy a much smaller volume within the coating, as compared to conventional extender pigments and (b) the naturally low oil absorption displayed by the microspheres. It is believed that these two characteristics of the "non-coated" hollow glass microspheres, allow the free movement of metal in a liquid phase between the spheres, thereby not restricting the overall conductivity of the coating. Conductivity remains virtually unchanged from relative volume levels of 1 volume metal:1 volume spheres to 1 volume metal:1.5 volume spheres.

In conventional cathodic and conductive coatings, typical extender pigments used are talcs (such as hydrated magnesium silicate) with an oil absorption of 45-60%; diatomaceous silica (such as celite) having greater than 50% oil absorption and fumed or pyrogenic silica, having oil absorption between 100 and 400%. The presence of these pigments causes an increased absorption of pigments onto the substrate surface. This results in the reduction of the critical pigment volume concentration. Pigment volume concentration (PVC) is the ratio of the pigment-volume to the total volume of the non-volatiles. It can be best expressed by the formula:

$$PVC = \frac{\text{pigment volume}}{\text{pigment volume} + \text{binder (polymer) volume}}$$

In a coating composition with low pigmentation, each pigment particle is assumed to be surrounded by binder. As the pigmentation increases, at a certain PVC, there is just enough binder to barely cover the pigment and fill the interstices. This PVC is called the critical PVC or CPVC.

Exceeding the CPVC results in voids and in the film becoming porous. Tensile strength, flexibility, corrosion resistance and water-vapor impermeability, all decrease. Thus if CPVC decreases, CPVC can be more easily exceeded, as with the above listed high oil absorption pigments. Hence, poor protection to the substrate results. The present invention solves these problems by utilizing light weight hollow glass microspheres, which have extremely low levels of oil absorption to partially or completely replace traditional pigments, thereby maintaining a high enough CPVC than would be possible, if one were to use pigments with high levels of oil absorption.

With regard to the second use of the invention, namely low-cost organic, conductive coatings for RFI and EMI shielding, it is well known that most electronic equipment including, computers, aerospace and military communications equipment (e.g., the "fly by wire" control systems common to modern aerospace computers) are subject to interference caused by numerous extraneous signals that can negatively affect the proper functioning of the electronic equipment. For example, such a shortfall in the anticipated performance of aerospace computers could result in the loss of aircraft and the failure of NASA projects.

Interference is even more pervasive when the cabinets which hold the electronic equipment, are made of the various plastics now in common use by the electronics industry for reducing weight and improving design capabilities. As these plastic housings are non-conductive, they do not provide a natural shielding to the computers from RFI and EMI. In order to eliminate or reduce this problem and to assure reliable functioning of important electronic equipment susceptible to RFI and EMI, effective shielding must be provided.

In recent years, surface coatings, either applied directly to the electronic equipment or applied to the plastic housings of the equipment, have been an important means of providing effective shielding from RFI and EMI. Organic coatings are preferred within the electronic industry, because of their cost effectiveness. Conventional organic coatings are non-conductive and would present the same problem as that faced by the plastic housings. Hence, conductive coatings were developed to provided proper shielding.

U.S. Pat. No. 4,522,890 ('890) issued Jun. 11, 1985 to Volkers et al., discloses a composite structure of thin films applied by vacuum deposition, including alternating layers of high conductivity metals and low conductivity metals to combine the effects of reflection and absorption and thereby maximize the reduction of the EMI/RFI signal strength as the signal passes through the thin films. Additionally, a similar structure of layers of materials with differing magnetic permeabilities may be used for the same purpose. The '890 patent itself points out some of the disadvantages of the technology disclosed therein. The shielding effect of thin films is acknowledged to be more effective on plastic or non-conductive substrates than on conductive substrates.

Additionally, the '890 patent reveals some of the problems associated with using traditional organic coatings which were designed to be conductive, by the use of a high conductivity metal powder such as copper or silver. While the EMI/RFI signal strength does reduce upon passing through such a coating, the coating itself is subject to adhesion problems and problems associated with the metal sinking to the substrate during drying (due to its high specific gravity) and thus causing a non-uniform coating. The settling during drying also raises the specter of the problems associated with zinc-rich coatings during storage. As described earlier, use of metal powders in conductive coatings results in settling of the metal during short-term storage and hence would deter efficient field use.

The problem of poor adhesion to non-metallic substrates, displayed by metal rich conductive coatings is overcome because of the extremely low oil absorption of the glass spheres. The problem of settling of the metal powder in both the cathodic and the conductive coating uses of the present invention is overcome, again due to the extremely low oil absorption of the microspheres as well as the low density of the microspheres.

Plastic materials which are conductive themselves have also been disclosed for use in manufacture of housings of electronic equipment susceptible to EMI/RFI. U.S. Pat. No. 4,765,928 issued Aug. 23, 1988 to M. Thakur, describes polymers having an intrinsic on conductivity of $10^{-9}$ to 10 mhos/cm, the polymers being "doped" with an electron donor or an electron acceptor dopant. Frequently, increasing the conductivity of these plastic materials compromises the strength and other characteristics such as design capability, which led to the use of plastics as the material for the housings.

As discussed above, the use of "non-coated", hollow, glass microspheres, instead of conventional pigments, in cathodic and conductive coatings, results in unaffected overall electrical conductivity; lower overall specific gravity of the coating; improved tensile strength, flexibility, corrosion resistance, water-vapor impermeability; and lower chances of "mud-cracking".

Having described the problems associated with prior art cathodic and conductive coatings, and the problems associated generally with the attempt to use the lightweight glass microspheres in coatings, the objects and aspects of the invention will be stated next.

SUMMARY OF THE INVENTION

It is a primary object of the first use of the present invention to provide a low-cost cathodic coating composition enhanced corrosion protection properties, comprising "non-coated", hollow glass microspheres.

It is a further object of the first use of the present invention to provide a cathodic coating composition comprising "non-coated", hollow glass microspheres, wherein said microspheres are not concentrated on the surface of the coating, when dry.

It is also an object of the first use of the present invention to provide a cathodic coating composition comprising "non-coated", hollow glass microspheres, wherein said microspheres are dispersed uniformly throughout the thickness of the coating, when dry.

It is yet another object of the first use of the present invention to provide a cathodic coating composition which delivers enhanced corrosion protection to metallic substrates susceptible to environmental attack.

It is still another object of the first use of the present invention to provide a cathodic coating composition having a substantially lower specific gravity when compared to conventional zinc-rich cathodic coatings.

It is also an object of the first use of the present invention to provide a cathodic coating composition which coating may be described as a good conductor (or which has a minimum conductivity of 3 ohms/cm$^2$).

It is a still further object of the first use of the present invention to provide a cathodic coating composition having improved adhesion to metallic substrates as compared to conventional zinc-rich cathodic coatings.

It is yet another object of the first use of the present invention to provide a cathodic coating composition, in which the metal phase does not settle "hard" during short term storage.

It is another object of the first use of the present invention to provide a cathodic coating composition which does not require expensive pre-treatment of the metal substrates prior to application of the coating.

It is also an object of the first use of the present invention to provide a cathodic coating composition with enhanced water-vapor impermeability.

It is yet another object of the first use of the present invention to provide a cathodic coating composition having a conductive phase which has greatly reduced density when compared to the density of the conductive phase in conventional zinc-rich cathodic coatings.

It is a primary object of the second use of the present invention to provide a low-cost conductive coating composition for the protection of metallic and non-metallic substrates from EMI/RFI interference, comprising "non-coated", hollow glass microspheres.

It is a further object of the second use of the present invention to provide a conductive coating composition, comprising "non-coated", hollow glass microspheres, wherein said microspheres are dispersed uniformly throughout the thickness of the coating when dry.

It is yet another object of the second use of the present invention to provide a conductive coating composition, which has a minimum conductivity of 5 ohms/cm$^2$.

It is still another object of the second use of the present invention to provide a conductive coating composition having a substantially lower specific gravity when compared to conventional organic metal-rich conductive coatings.

It is also an object of the second use of the present invention to provide a conductive coating composition which effects a sufficient attenuation of EMI/RFI signals so as to greatly reduce or eliminate EMI/RFI interference of electronic equipment coated with the conductive coatings of the present invention.

It is a still further object of the second use of the present invention to provide a conductive coating composition with enhanced adhesion to both metallic and non-metallic (e.g. plastic) substrates.

It is yet another object of the second use of the present invention to provide a conductive coating composition in which the conductive metal does not settle "hard" during short term storage.

It is a primary object of both uses of the present invention to provide coating compositions with low overall specific gravity, thus allowing easy fluidization, when used in the form of a powder coating.

It is another object of both uses of the present invention to provide coating compositions with significantly lower VOC (volatile organic content) levels, as compared to conventional coatings having conventional extender pigments instead of the glass microspheres, said conventional coatings having equal corrosion resistance and EMI/RFI protection properties.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the compositions particularly pointed out in the appended claims.

To achieve the foregoing and other objects, and in accordance with one aspect of the present invention as described herein, there is provided a coating composition for use in protecting metallic substrates from corrosion and in protecting metallic and non-metallic substrates from EMI and RFI interference, said composition resulting in a coating having a minimum conductivity, when dry, of 5 ohms/cm$^2$, comprising in volume percent, based on the total volatile-component-free volume of the composition: from about 20% to 60% of film-forming polymer; from about 10% to 50% of a conductive phase, said conductive phase having a minimum relative conductivity with respect to copper of 0.2, said conductive phase being present in said coating composition in a form designed to increase the solids volume of said coating composition without reducing the conductivity of said coating composition, and said conductive phase having a more negative electrode potential than said substrate; and from about 2% to 40% of hollow glass microspheres having diameters ranging from 1 to about 150 microns and a specific gravity of 0.3 to 1.2.

In accordance with a second aspect of the present invention, there is provided a coating composition for use in protecting metallic substrates from corrosion, said composition resulting in a coating having a minimum conductivity, when dry, of 5 ohms/cm$^2$, comprising in volume percent, based on the total volatile-component-free volume of the composition: from about 20% to 40% of film-forming polymer; from about 10% to 50% of a conductive phase, said conductive phase having an average particle size ranging from 4 to 12 microns, and said conductive phase having a more negative electrode potential than said substrate; and from about 30% to 40% of hollow glass microspheres having diameters ranging from 1 to about 150 microns and a specific gravity of 0.3 to 1.2.

In accordance with a third aspect of the present invention, there is provided a coating composition for use in protecting metallic and non-metallic substrates from EMI and RFI interference, said composition resulting in a coating having a minimum conductivity, when dry, of 5 ohms/cm$^2$, comprising in volume percent, based on the total volatile-component-free volume of the composition: from about 40% to 60% of film-forming polymer; from about 10% to 30% of a conductive phase, said conductive phase having a minimum relative conductivity with respect to copper of 0.2, and said conductive phase being present in said coating composition in a form designed to increase the solids volume of said coating composition, without reducing the conductivity of said coating composition; and from about 20% to 30% of hollow glass microspheres having diameters ranging from 1 to about 150 microns and a specific gravity of 0.3 to 1.2.

The following description provides preferred embodiments of this invention, simply by way of illustration, of some of the best modes contemplated for carrying out the invention. As will be realized, the invention is capable of modification in various, obvious aspects all without departing from the invention. Accordingly the description will be regarded as illustrative in nature and not restrictive.

DETAILED DESCRIPTION OF THE INVENTION

The use of "non-coated" lightweight, glass, hollow microspheres having a diameter of 1 to about 150 microns, forms a critical aspect of the present invention. Such microspheres are manufactured by 3M Corporation, by the PQ Corporation, and by Potter Industries Inc., a subsidiary of PQ Corporation.

3M Corp. sells these microspheres under the trademark SCOTCHLITE TM. SCOTCHLITE TM microspheres are available in at least eight(8) different size ranges, but those which are most preferred for the practice of this invention are the microspheres that are designated B37/2000 and S60/10,000. The B37's have a nominal density of 0.37 gms/cc and a density range of 0.34 to 0.40 gms/cc. They have a bulk density ranging from 0.19 to 0.27 gms/cc. They have a typical isostatic crush resistance of 2000 psi, with the range being from about 1000–3000 psi. The B60's have a nominal density of 0.60 gms/cc and a density range of 0.57 to 0.63 gms/cc. They have a bulk density ranging from 0.31 to 0.43 gms/cc. They have a typical isostatic crush resistance of 10,000 psi, with the range being from about 6000–15,000 psi. All of the 8 different size ranges have a surface oil absorption of 31-36 gms oil/100cc of glass bubbles, when tested in accordance with ASTM D1483.

The PQ corporation sells their hollow glass microspheres under the trademark EXTENDOSPHERES TM. EXTENDOSPHERES TM are available in at least three (3) different size ranges, but those which are most preferred for the practice of this invention are the microspheres designated SL-150. The SL-150 microspheres have a density range of 0.68-0.70 gms/cc. They have a bulk density of about 0.39 gms/cc. They have a compressive strength of 4000 psi.

Potter Industries, an affiliate of the PQ Corporation, sells their hollow glass microspheres under the trademark SPHERICEL TM. SPHERICEL TM are available in a single size, entitled 110P8. The 110P8 microspheres are slightly heavier than water (in terms of specific gravity) and have a bulk density of 1.1 gms/cc. They have a crush strength of greater than 10,000 psi. They have surface oil absorption of 43.5 gms oil/100 cc of glass bubbles. As with the SCOTCHLITE TM bubbles and the EXTENDOSPHERES TM, no oil is actually absorbed by the SPHERICEL TM bubbles, the oil absorption values reported, being the amount of oil necessary to wet the surface of the glass.

From about 2 to 40 volume percent of hollow glass microspheres, based on the total volatile-component-free volume of the composition, are essential for the practice of this invention. All volume percentages expressed hereinafter will be based on total volatile-component-free volume of the composition, unless otherwise indicated.

Preferred film-forming polymers for use in this invention are selected from one of three groups of polymers. The first group consists of epoxy resins, vinyl chloride resins copolymerized with isocyanates, polyurethane resins, polyester resins, oil-modified polyester resins or alkyds, polymers of acrylic and methacrylate esters, and mixtures thereof. If binders from this first group are selected, volatile components are used and they are solvents, i.e., the binders are soluble in the volatile components. The second group of film-forming polymers are lattices prepared by the emulsion polymerization of monomers selected from the group consisting of acrylic, methacrylic or vinyl monomers, water-borne urethanes and mixtures thereof. The third group consists of film-forming polymers which are especially suited for use in powder coatings applied by electrostatic means or by fluidized bed immersion techniques, including polyester powders, epoxy powders, acrylic powders, and urethane powders. About 20–60% volume percent of film-forming polymer, selected from one of the above three groups, is essential.

If the film-forming polymer is selected from the first group, the volatile component is selected from the group consisting of aliphatic hydrocarbons, aromatic hydrocarbons, esters, ketones, ether-alcohols, ether esters and mixtures thereof or water. If the film-forming polymer is an emulsion polymer, the volatile component is water.

When an emulsion polymer is used as the film-forming polymer, the use of appropriate wetting agents and chemical thickeners inhibits the movement of the glass microspheres floating/rising to the surface of the coating. The wetting agents comprise a lipophilic portion and a hydrophilic portion. The lipophilic portion is selected from the group consisting of the hydrocarbon chain of a fatty acid, a petroleum hydrocarbon chain or an aromatic hydrocarbon with alkyl side chains. The hydrophilic part is selected from the group consisting of a carboxylate, sulfate, sulfonate, alcohol or ether alcohol. Colloids and thickeners are used to thicken the water phase and reduce settling. Thickening agents are selected from the group consisting of sodium salts of carboxyl-containing acrylic polymers, hydroxyethyl cellulose, carboxymethyl cellulose, colloidal clay and gum arabic. The preferred thickening agent is Acrysol G-110 by Rohm and Haas.

With respect to both uses of the present invention, it is extremely important that the final coating itself be a good conductor (have a conductivity of at least 3 ohms/cm$^2$). As previously discussed, the low oil absorption of the spheres and the much smaller volume occupied by the spheres compared to conventional extender pigments, do not inhibit the overall conductivity of the coating itself.

The presence of lightweight, hollow glass microspheres reduces the specific gravity of the coating composition, versus a traditional cathodic or conductive coating composition, which would consist of an extender pigment such as a talc, silica ($SiO_2$), calcium carbonate, etc. This difference in the specific gravity, reduces the weight of coating that is required to obtain the same thickness, if a traditional coating were used. Shipping and handling costs are also reduced, because the weight is reduced. Problems associated with settling and the like, during short-term storage are also reduced.

The reduced levels of oil absorption for the microspheres, increases the CPVC, as discussed above. Hence, it is less likely that the CPVC will be exceeded and that problems associated with a PVC greater than CPVC will occur. Better protection to the substrate results. The low specific gravity and the low oil absorption also results in better adhesion to substrate, due to more available binder.

Coatings of the present invention are especially suited for use as cathodic coatings and as conductive coatings for the attenuation of EMI/RFI interference signals in applications involving electronic equipment. When used as cathodic coatings, the conductive phase is selected from the group consisting of zinc and di-iron phosphide. In the cathodic coatings the metal is preferably present in the powder form. Zinc powder is the preferred conductive phase used as a "sacrificial anode". Zinc is selected because it has a more negative standard electrode potential than iron, which is the most common substrate. The zinc in the coating is thus anodic with respect to the iron. Thus the transformation of iron into soluble ions, which mechanism is at the heart of the corrosion phenomenon, cannot occur. The zinc corrodes by forming zinc oxide, which in turn further prevents corrosion. The dried film, in order to give effective cathodic protection to steel should contain zinc in such volume, that the particles are in electrical contact. As discussed above, in the "Summary of the Invention", the microspheres aid in this desired configuration of the zinc particles.

It has been determined that a conductivity of approximately 3 ohms/cm$^2$ over the surface of a zinc-based primer is optimal for cathodic protection to ferrous substrates. Laboratory tests over a 6 month period have demonstrated that the addition of the hollow microspheres on a volume basis of up to 150% of the zinc, at approximately 75 microns, does not decrease the conductivity as compared to that of a microsphere-free coating. Saltspray tests at 1000 hours incorporating 150 volume % (of zinc) of the spheres, conducted in accordance with ASTM B117, and tested against a "control" which was microsphere-free, provided equal corrosion resistance. Conductivity remains virtually unchanged from relative volume levels of 1 volume metal:1 volume spheres to 1 volume metal:1.5 volume spheres.

To compare the effectiveness of the spheres with a common extender pigment such as crystalline silica, a formula was prepared comprising: 1 volume of zinc: $\frac{3}{4}$ volume of binder: 1$\frac{1}{2}$ volume of crystalline silica. This coating was tested for conductivity at 75 microns. The conductivity was seen to be 75-100 ohms/cm$^2$, and thus too low for cathodic protection. When the volume of silica was replaced by an equal volume of the B37's, conductivity was measured at 1-2 ohms/cm$^2$, thus providing excellent cathodic protection. About 10-50 volume % of metal is used for effective cathodic protection in the coatings of the present invention.

When coating compositions of this invention are to be used as conductive coatings for attenuation of EMI/RFI interference signals in application involving electronic components, the conductive phase is selected from the group consisting of silver, gold, copper and nickel. The conductive phase is present in flake form, in powder form, as metal coated spheres or filaments. Conductive phase filaments are preferred because they enhance the conductivity the most. Typically, the following metals (with their relative conductivities compared to copper, listed in brackets), have been used to manufacture conductive coatings: silver(1.05); copper(1.0); gold(0.7); aluminum(0.61) and nickel(0.20). Copper, based on its high conductivity and low cost would have been the ideal choice, were it not for the propensity of copper to oxidize and deteriorate in corrosive and harsh environments. Silver and gold are excellent choices, but their high cost restricts their use. Aluminum is not used because of immediate oxidation when in contact with air. Because of the above inadequacies and because of its excellent chemical and corrosion resistance, reasonable cost and good conductivity over non-conductive plastic, nickel filament is the preferred conductive phase. About 10-30 volume % of metal is used for effective EMI/RFI protection in the coatings of the present invention.

Compositions in accordance with the invention can be prepared either as single component or two component types, depending upon the resin which is used as a binder and depending on whether the coating desired is a powder or not. The method of preparation includes simple mixing of the various components, with the microspheres preferably being added last and incorporated uniformly in the mixture without strong shearing action, preferably using a plastic impeller.

When an alkyd or an epoxy resin is used as the binder, conventional drying or hardening agents for the resin may be included, such as organic salts of cobalt, zirconium and calcium, in a total amount up to about 1% by weight. See Example 1. Alternatively, hardening agents such as amines, polyamines, polyamides or melamines may be used, in amounts up to about the percentage of the epoxy resin.

As is well known, epoxy resins are the reaction product of an epihalohydrin and a polyol. Hardening or crosslinking agents for epoxy resins include at least one compound with an $-NH_2$, $-CONH_2$, $-NHR$, $-CONHR$, and/or $-COOH$ functional group, which reacts with the epoxy function. The preparation of epoxy resins and crosslinking reactions are described in U.S. Pat. No. 3,954,693, issued May, 1976 to C. C. Fong, the disclosure of which is incorporated by reference. Epoxy resins suitable for use in the present invention include those produced by Shell Chemical Company under the trademarks "Shell 1123" and "Shell 828", and by Ciba-Geigy Co. under the trademark "488-60 Epoxy". Other equivalent epoxy resins are commercially available.

Polyvinyl chloride resins are commercially available, such as that sold under the trademark "UCAR-VYES" by Union Carbide Corporation. Such a resin is copolymerizable with an isocyanate.

Urethane polymers are produced by reaction of a polyisocyanate with a polyol, as taught in U.S. Pat. No. 3,725,355, issued April, 1973 to D. B. Parrish et al., the disclosure of which is incorporated by reference.

Polyesters are the reaction products of poly-basic acids and polyhydric alcohols. Oil-modified polyesters are those modified by oils or mono-basic fatty acids. Oil-modified polyesters are also known as alkyds.

Esters of acrylic and methacrylic acid, i.e., ethyl acrylate and methyl methacrylate undergo polymerization in the presence of free radical limitators such as the peroxides, and these products may also be used as binders.

Emulsion polymers are typically prepared by the emulsification in water of acrylic, methacrylate or vinyl monomers, with an emulsifier such as sodium lauryl sulfate. A water soluble catalyst, e.g. ammonium persulfate, is added to the aqueous phase to generate free radicals.

Coatings of the present invention can be applied in any conventional manner such as spraying, dipping, flowcoating and rollercoating or by electrostatic spraying when the coating to be applied is in a powder form.

The coatings are dry to the touch after about 30 minutes under ordinary conditions, and can be recoated thereafter. Powder coatings of the present invention are most effectively cured at 325°–450° F. The volatile-component-containing coatings are delivered in the thixotropic state permitting the customer to add the volatile phase depending on the particular application the coating will be used for. If the coating is not delivered in the thixotropic state, the light spheres would float to the surface.

The following specific examples are given to illustrate preferred embodiments of compositions of the invention but are not to be construed as limitations on the invention herein claimed.

EXAMPLE 1

A single component cathodic coating composition was prepared by mixing the constituents listed below with the microspheres being added last. The quantities are in percent by volume based on the total volume:

| | |
|---|---|
| Epoxy ester[1] | 26.4 |
| Hollow glass microspheres[2] | 27.5 |
| Zinc dust[3] | 11.0 |
| Hydrophobic fumed silica[4] | 0.5 |
| Anti-settling agent[5] | 6.5 |
| Wetting, rheologiocal agent[6] | 0.7 |
| Drier[7] | 1.0 |
| Drier[8] | 1.0 |
| Anti-skim[9] | 1.0 |
| Solvent[10] | 24.4 |

[1]411 resin by Rechhold
[2]B37/2000 SCOTCHLITE ™ Microspheres by 3M
[3]Zinc dust #6 by Purity Zinc
[4]Aerosol 300 by DeGussa
[5]Fe Phos 32 by Oxy Chem
[6]Anti-terra 304 by Byk Chemie
[7]12% cobalt by Mooney Chemicals
[8]8% zirconium by Mooney Chemicals
[9]Methylethyl ketoxime Mooney Chemicals
[10]Methyl-isobutyl ketone by Eastman Chemicals

EXAMPLE 2

A single component cathodic powder coating composition was prepared by mixing the constituents listed below with the microspheres being added last. The quantities are in percent by volume based on the total volume:

| | |
|---|---|
| Epoxy powder resin[1] | 24.0 |
| Hollow glass microspheres[2] | 3.2 |
| Zinc dust[3] | 42.0 |
| Hardener[4] | 1.5 |
| Conductive and welding additive[5] | 22.6 |
| Amorphous silica[6] | 4.8 |
| Hydrophobic fumed silica[7] | 1.3 |
| Flow control agent[8] | 0.6 |

[1]Epon 2002 powder by Shell Chemicals
[2]3M Corp, S 60/10,000 SCOTCHLITE ™
[3]Zinc dust #6 by Purity Zinc
[4]Huls B-68 by Huls
[5]Fe Phos 32 by Oxy Chem
[6]Novacite 337 by Novern Chemicals
[7]Aerosil 972 by DeGussa
[8]Resiflow P-67 by Estron Chemicals

EXAMPLE 3

A single component waterborne urethane conductive nickel coating composition for protection against EMI/RFI interference was prepared by mixing the constituents listed below with the microspheres being added last. The quantities are in percent by volume based on the total volume:

| | |
|---|---|
| Polyurethane resin[1] | 31.7 |
| Hollow borsilicate glass microspheres[2] | 16.0 |
| Nickel flakes[3] | 10.8 |
| Thickener[4] | 0.6 |
| Co-solvent[5] | 4.9 |
| Wetting agent[6] | 0.5 |
| Chemical thickener[7] | 1.5 |
| Water | 33.0 |
| Defoamer[8] | 0.3 |
| Dispersing agent[9] | 0.7 |

[1]Neorez 960 - ICI
[2]B 60/10,000 by 3M
[3]Nickel HCA-1 by Novamet
[4]Ammonia 28%
[5]Texanol by Eastman Chemicals
[6]Byk 342 by Byk Chemie
[7]G-110 by Rohm & Haas
[8]Drew Y-200 by Drew Chemical
[9]Tamol 165 by Rohm & Haas

EXAMPLE 4

A single component conductive nickel powder coating composition for protection against EMI/RFI interference was prepared by mixing the constituents listed below with the microspheres being added last. The quantities are in percent by volume based on the total volume:

| | |
|---|---|
| Powder epoxy resin[1] | 47.2 |
| Hollow borosilicate glass microspheres[2] | 24.6 |
| Nickel flakes[3] | 20.6 |
| Hardener[4] | 1.8 |
| Flow control agent[5] | 0.8 |
| Hydrophobic fumed silica[6] | 0.8 |

[1]Epon 2002 by Shell Chemicals
[2]B 60/10,000 by 3M
[3]Nickel HCA-1 by Novamet
[4]Huls B-68 by Huls
[5]Resiflow PV-88 by Estron
[6]Aerosil 972 by DeGussa

What is claimed is:

1. A coating composition for use in protecting metallic substrates from corrosion and in protecting metallic and non-metallic substrates from EMI and RFI interference, said composition resulting in a coating having a minimum conductivity, when dry, of 5 ohms/cm$^2$, comprising in volume percent, based on the total volatile-component-free volume of the composition:

from about 20% to 60% of film-forming polymer;
from about 10% to 50% of a conductive phase, said conductive phase having a minimum relative conductivity with respect to copper of 0.2, said conductive phase being present in said coating composition in a form designed to increase the solids volume of said coating composition without reducing the conductivity of said coating composition, and said conductive phase having a more negative electrode potential than said substrate; and
from about 2% to 40% of non-coated hollow glass microspheres having diameters ranging from 1 to about 150 microns and a specific gravity of 0.3 to 1.2.

2. The composition of claim 1 wherein the film-forming polymer is selected from the group consisting of epoxy resins, vinyl chloride resins copolymerized with isocyanates, polyurethane resins, polyester resins, oil-modified polyester resins, polymers of acrylic and methacrylic esters and mixtures thereof.

3. The composition of claim 1 wherein the film-forming polymer is a waterborne urethane or an emulsion polymer prepared by the polymerization of monomers selected from the group consisting of acrylic, methacrylic, vinyl or styrenic monomers, and mixtures thereof.

4. The composition of claim 1, said coating being used to protect metallic substrates only, wherein said coating is a powder coating and said film-forming polymer is selected from the group consisting of polyesters, epoxies, acrylics, urethanes and mixtures thereof.

5. The composition of claim 2, 3 or 4 wherein said conductive phase is selected from the group consisting of gold, silver, copper, nickel, zinc, di-iron phosphide, and mixtures thereof.

6. The composition of claim 5 wherein the form of said conductive phase is selected from the group consisting of flakes, a powder, metal-coated spheres, filaments and mixtures thereof.

7. The composition of claim 6 wherein said conductive phase is powdered zinc.

8. The composition of claim 6 wherein said conductive phase is nickel, in filament form.

9. The composition of claim 6 wherein said conductivity remains the same for a conductive phase to glass spheres volume ratio of 1:1 to 1.5:1.

10. The composition of claim 6 wherein said glass microspheres have a surface oil absorption of less than 50 gms oil per 100 cc of glass bubbles, when tested in accordance with ASTM D1483.

11. The composition of claim 10 wherein said oil absorption is between 31 and 36 gms oil per 100cc of glass bubbles.

12. The composition of claim 11 wherein said specific gravity is between 1.0 and 1.2.

13. The composition of claim 1 wherein sd. glass microspheres are composed of sodium borosilicate glass and have an isostatic crush resistance of at least 8000 psi as determined by ASTM D1302.

14. The composition of claim 3 further comprising: thickening agents selected from the group consisting of sodium salts of carboxyl-containing acrylic polymers, hydroxyethyl cellulose, colloidal clay and gum arabic, present in an amount ranging from 2 to 6 volume percent based on the total volume of the composition.

15. The composition of claim 14 further comprising: wetting agents which have a lipophilic part and a hydrophilic part, said lipophilic part being selected from the group consisting of the hydrocarbon chain of fatty acid, a petroleum hydrocarbon chain or an aromatichydrocarbon with alkyl side chains and said hydrophilic part being selected from the group consisting of a carboxylate, sulfate, sulfonate, alcohol or ether-alcohol, present in an amount ranging from 0.3 to 1 volume percent based on the total volume of the composition.

16. The composition of claim 2 wherein said coating composition further comprises a volatile component, selected from the group consisting of aliphatic hydrocarbons, aromatic hydrocarbons, esters, ketones, ether alcohols, ether esters and mixtures thereof or water.

17. A coating composition for use in protecting metallic substrates from corrosion, said composition resulting in a coating having a minimum conductivity, when dry, of 5 ohms/cm$^2$, comprising in volume percent, based on the total volatile-component-free volume of the composition:

from about 20% to 40% of film-forming polymer;

from about 10% to 50% of a conductive phase, said conductive phase having an average particle size ranging from 4 to 12 microns, and said conductive phase having a more negative electrode potential than said substrate; and from about 30% to 40% of non-coated hollow glass microspheres having diameters ranging from 1 to about 150 microns and a specific gravity of 0.3 to 1.2.

18. The composition of claim 17 wherein the film-forming polymer is selected from the group consisting of epoxy resins, vinyl chloride resins copolymerized with isocyanates, polyurethane resins, polyester resins, oil-modified polyester resins, polymers of acrylic and methacrylic esters and mixtures thereof.

19. The composition of claim 17 wherein the film-forming polymer is a waterborne urethane or an emulsion polymer prepared by the polymerization of monomers selected from the group consisting of acrylic, methacrylic, vinyl or styrenic monomers, and mixtures thereof.

20. The composition of claim 17 wherein sd. coating is a powder coating and sd. film-forming polymer is selected from the group consisting of polyesters, epoxies, acrylics and urethanes.

21. The composition of claim 18, 19 or 20 wherein said conductive phase is selected from the group consisting of zinc, di-iron phosphides and mixtures thereof.

22. The composition of claim 21 wherein the form of said conductive phase is selected from the group consisting of flakes, a powder, metal coated spheres and mixtures thereof.

23. The composition of claim 22 wherein said conductive phase is powdered zinc.

24. The composition of claim 22 wherein said conductivity remains the same for a metal to glass spheres volume ratio of 1:1 to 1.5:1.

25. The composition of claim 22 wherein said glass microspheres have a surface oil absorption of less than gms oil per 100 cc of glass bubbles, when tested in accordance with ASTM D1483.

26. The composition of claim 25 wherein said oil absorption is between 31 and 36 gms oil per 100cc of glass bubbles.

27. The composition of claim 26 wherein said specific gravity is between 1.0 and 1.2.

28. The composition of claim 17 wherein sd. glass microspheres are composed of sodium borosilicate glass and have an isostatic crush resistance of at least 8000 psi as determined by ASTM D1302.

29. The composition of claim 19 further comprising: thickening agents selected from the group consisting of sodium salts of carboxyl-containing acrylic polymers, hydroxyethyl cellulose, colloidal clay and gum arabic, present in an amount ranging from 2 to 6 volume percent based on the total volume of the composition.

30. The composition of claim 29 further comprising: wetting agents which have a lipophilic part and a hydrophilic part, said lipophilic part being selected from the group consisting of the hydrocarbon chain of fatty acid, a petroleum hydrocarbon chain or an aromatic hydrocarbon with alkyl side chains and said hydrophilic part being selected from the group consisting of a carboxylate, sulfate, sulfonate, alcohol or ether-alcohol, present in an amount ranging from 0.3 to 1 volume percent based on the total volume of the composition.

31. The composition of claim 18 wherein said coating composition further comprises a volatile component, selected from the group consisting of aliphatic hydrocarbons, aromatic hydrocarbons, esters, ketones, ether alcohols, ether esters and mixtures thereof or water.

32. A coating composition for use in protecting metallic and non-metallic substrates from EMI and RFI interference, said composition resulting in a coating having a minimum conductivity, when dry, of ohms/cm$^2$, comprising in volume percent, based on the total volatile-component-free volume of the composition:

from about 40% to 60% of film-forming polymer;
from about 10% to 30% of a conductive phase, said conductive phase having a minimum relative conductivity with respect to copper of 0.2, and said conductive phase being present in said coating composition in a form designed to increase the solids volume of said coating composition without reducing the conductivity of said coating composition; and
from about 20% to 30% of non-coated hollow glass microspheres having diameters ranging from 1 to about 150 microns and a specific gravity of 0.3 to 1.2.

33. The composition of claim 32 wherein the film-forming polymer is selected from the group consisting of epoxy resins, vinyl chloride resins copolymerized with isocyanates, polyurethane resins, polyester resins, oil-modified polyester resins, polymers of acrylic and methacrylic esters and mixtures thereof.

34. The composition of claim 32 wherein the film-forming polymer is a waterborne urethane or an emulsion polymer prepared by the polymerization of monomers selected from the group consisting of acrylic, methacrylic, vinyl or styrenic monomers, and mixtures thereof.

35. The composition of claim 32, said coating being used to protect metallic substrates only, wherein said coating is a powder coating and said film-forming polymer is selected from the group consisting of polyesters, epoxies, acrylics, urethanes and mixtures thereof.

36. The composition of claim 33, 34 or 35 wherein said conductive phase is selected from the group consisting of gold, silver, copper, nickel, and mixtures thereof.

37. The composition of claim 36 wherein the form of said conductive phase is selected from the group consisting of flakes, a powder, metal-coated spheres, filaments and mixtures thereof.

38. The composition of claim 37 wherein said conductive phase is nickel, in filament form.

39. The composition of claim 37 wherein said conductivity remains the same for a metal to glass spheres volume ratio of 1:1 to 1.5:1.

40. The composition of claim 37 wherein said glass microspheres have a surface oil absorption of less than 50 gms oil per 100 cc of glass bubbles, when tested in accordance with ASTM D1483.

41. The composition of claim 40 wherein said oil absorption is between 31 and 36 gms oil per 100cc of glass bubbles.

42. The composition of claim 41 wherein said specific gravity is between 1.0 and 1.2.

43. The composition of claim 32 wherein said glass microspheres are composed of sodium borosilicate glass and have an isostatic crush resistance of at least 8000 psi as determined by ASTM D1302.

44. The composition of claim 34 further comprising: thickening agents selected from the group consisting of sodium salts of carboxyl-containing acrylic polymers, hydroxyethyl cellulose, colloidal clay and gum arabic, present in an amount ranging from 2 to 6 volume percent based on the total volume of the composition.

45. The composition of claim 44 further comprising: wetting agents which have a lipophilic part and a hydrophilic part, said lipophilic part being selected from the group consisting of the hydrocarbon chain of fatty acid, a petroleum hydrocarbon chain or an aromatic hydrocarbon with alkyl side chains and said hydrophilic part being selected from the group consisting of a carboxylate, sulfate, sulfonate, alcohol or ether-alcohol, present in an amount ranging from 0.3 to 1 volume percent based on the total volume of the composition.

46. The composition of claim 33 wherein said coating composition further comprises a volatile component, selected from the group consisting of aliphatic hydrocarbons, aromatic hydrocarbons, esters, ketones, ether alcohols, ether esters and mixtures thereof or water.

* * * * *

UNITED STATES PATENT AND TRADEMARK OFFICE
CERTIFICATE OF CORRECTION

PATENT NO. : 5,252,632
DATED : October 12, 1993
INVENTOR(S) : Ronald R. Savin

It is certified that error appears in the above-indentified patent and that said Letters Patent is hereby corrected as shown below:

Column 17, line 11,12, (claim 32), between "of" and "ohms/cm²", please insert --5--.

Signed and Sealed this

Fourteenth Day of June, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,252,632
DATED : October 12, 1993
INVENTOR(S) : Ronald R. Savin

It is certified that error appears in the above-indentified patent and that said Letters Patent is hereby corrected as shown below:

Column 15, line 36, (claim 13), "sd.", should read --said--

Column 16, line 23, (claim 20), "sd.", should read --said--

Column 16, line 24, (claim 20), "sd.", should read --said--

Column 16, line 48, (claim 28), "sd.", should read --said--

Signed and Sealed this

Twenty-second Day of November, 1994

Attest:

BRUCE LEHMAN

Attesting Officer

Commissioner of Patents and Trademarks